US009360872B2

(12) United States Patent
Pifer et al.

(10) Patent No.: US 9,360,872 B2
(45) Date of Patent: Jun. 7, 2016

(54) FUEL TANK VENT VALVE ASSEMBLY AND METHOD OF ASSEMBLY

(71) Applicant: Eaton Corporation, Cleveland, OH (US)

(72) Inventors: Daniel Lee Pifer, Chelsea, MI (US); Christy N. Roadknight, Royal Oak, MI (US); Jim James, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 135 days.

(21) Appl. No.: 14/179,592

(22) Filed: Feb. 13, 2014

(65) Prior Publication Data
US 2014/0158216 A1   Jun. 12, 2014

Related U.S. Application Data

(63) Continuation-in-part of application No. 13/334,519, filed on Dec. 22, 2011, now Pat. No. 8,689,816.

(51) Int. Cl.
| F16K 24/04 | (2006.01) |
| G05D 16/04 | (2006.01) |
| F16K 11/074 | (2006.01) |
| F16K 11/076 | (2006.01) |
| B60K 15/035 | (2006.01) |
| B60K 15/03 | (2006.01) |

(52) U.S. Cl.
CPC .............. *G05D 16/04* (2013.01); *B60K 15/035* (2013.01); *F16K 11/074* (2013.01); *F16K 11/076* (2013.01); *F16K 24/044* (2013.01); *B60K 2015/03453* (2013.01); *B60K 2015/03542* (2013.01); *B60K 2015/03557* (2013.01); *Y10T 137/0402* (2015.04); *Y10T 137/7837* (2015.04)

(58) Field of Classification Search
CPC ..... F16K 24/04; F16K 24/042; F16K 24/044; F16K 11/074; F16K 11/076; B60K 15/035; B60K 15/03519; B60K 2015/03542; B60K 2015/03557; B60K 2015/03453; G05D 16/04
USPC .............. 137/43, 202; 141/198; 123/518, 519
See application file for complete search history.

(56) References Cited

U.S. PATENT DOCUMENTS

| 6,443,177 B2 * | 9/2002 | Romanek ...................... 137/202 |
| 6,675,779 B2 * | 1/2004 | King et al. .................... 123/519 |
| 6,742,536 B2 * | 6/2004 | Mills .......................... 137/15.17 |
| 7,152,586 B2 * | 12/2006 | Aoki et al. .................... 123/516 |
| 7,530,348 B2 * | 5/2009 | Wang et al. .................... 123/518 |
| 8,689,816 B2 * | 4/2014 | Pifer ............................ 137/202 |
| 8,720,471 B2 * | 5/2014 | Yasuda et al. ................. 137/202 |

(Continued)

FOREIGN PATENT DOCUMENTS

| EP | 1617113 A1 | 1/2006 |
| WO | 2009095780 A2 | 8/2009 |

*Primary Examiner* — William McCalister
*Assistant Examiner* — Ian Paquette
(74) *Attorney, Agent, or Firm* — Quinn Law Group, PLLC

(57) ABSTRACT

A vent valve assembly includes a first housing component, a second housing component, and a third housing component, as well as a first valve and a second valve. The first, second, and third housing components are configured to assemble together along one directional axis with the second housing component, the first valve and the second valve between the first and third housing components and with the second valve laterally-spaced from the first valve. A vapor flow path directs vapor from the first valve to the second valve, thereby reducing an overall height of the vent valve assembly.

37 Claims, 6 Drawing Sheets

(56) References Cited

U.S. PATENT DOCUMENTS

| | | | |
|---|---|---|---|
| 2003/0062083 A1* | 4/2003 | Nishi et al. | 137/202 |
| 2004/0007262 A1* | 1/2004 | Hattori | 137/202 |
| 2007/0102043 A1* | 5/2007 | Ehrman et al. | 137/202 |
| 2010/0282335 A1 | 11/2010 | Mills | |

* cited by examiner

FUEL TANK VENT VALVE ASSEMBLY AND METHOD OF ASSEMBLY

CROSS-REFERENCE TO RELATED APPLICATION

This application is a continuation-in-part of U.S. application Ser. No. 13/334,519, filed on Dec. 22, 2011, which is hereby incorporated by reference in its entirety.

TECHNICAL FIELD

The present teachings generally include a vent valve assembly and a method of assembling a vent valve assembly.

BACKGROUND

Fuel tank vent valve assemblies are used to regulate the vapor pressure within the fuel tank by allowing the venting of vapors under predetermined conditions. Some vent valve assemblies integrate more than one valve in a common housing. Assembly of vent valve assemblies having multiple valves and housing components can be complex and time-consuming.

SUMMARY

A vent valve assembly with a first valve and a second valve is provided with a configuration that simplifies assembly and provides a minimal height profile. The vent valve assembly includes a first housing component, a second housing component secured to the first housing component, and a third housing component. An inner cap is joined to the second housing component at a sealed joint. The third housing component secures to the first housing component such that the inner cap, the second housing component, the first valve and the second valve are surrounded by the first and third housing components. The first and the second housing components and the inner cap define a nonlinear vapor flow path that directs vapor from the first valve to the second valve.

In one embodiment, the third housing component can be attached to a fuel tank member, such as to the inner surface of a fuel tank. For example, the third housing component can be heat fused to the fuel tank. Because the inner cap and not the third housing component defines the vapor flow path between the first and second valves, the integrity of the sealed joint of the inner cap to the second housing component is not compromised by expansion or contraction of the third housing component associated with the process of attaching the third housing component to the fuel tank.

The first, second, and third housing components are configured to assemble together along one directional axis with the second housing component, the first valve and the second valve between the first and third housing components and with the second valve laterally-spaced from the first valve. An overall height of the vent valve assembly is thus minimized. In an embodiment in which the first valve is a liquid-vapor discriminating valve and the second valve is a pressure-holding valve, the minimal height of the vent valve assembly allows the liquid-vapor discriminating valve to be positioned higher in the fuel tank, resulting in a higher fuel shutoff height.

A method of assembling a fuel tank vent valve assembly having a first valve and a second valve includes assembling first, second, and third housing components to one another along one directional axis, with the first valve positioned at a first opening in the second housing component, and the second valve positioned at a second opening in the second housing component. The method includes securing a cap to the second housing component so that the first housing component, the second housing component, and the cap define a vapor flow path that directs vapor from the first valve to the second valve. The method further includes securing a third housing component to the first housing component such that the inner cap, the second housing component, the first valve and the second valve are surrounded by the first and the third housing components.

Because the housing components of the vent valve assembly are configured to be assembled along one directional axis, assembly is simplified and assembly time is reduced. Even with the second valve laterally displaced from the first valve, assembly of the valves and housing components is along only one directional axis. With previous vent valve assemblies, housing components were required to be assembled from several directions along multiple directional axes. With the present teachings, assembly fixtures that hold the components need to be positioned to move only along a single directional axis, reducing floor space necessary for the assembly process.

The above features and advantages and other features and advantages of the present teachings are readily apparent from the following detailed description of the best modes for carrying out the present teachings when taken in connection with the accompanying drawings.

DETAILED DESCRIPTION

Figure 1:
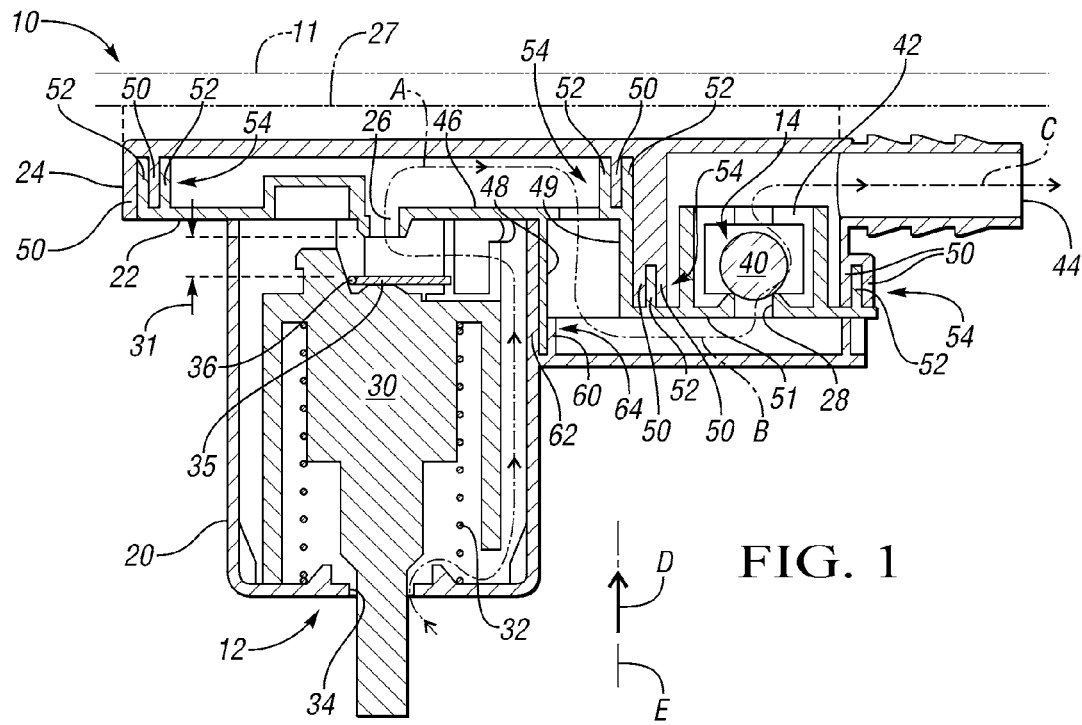
FIG. 1 is a schematic cross-sectional illustration of a first embodiment of a vent valve assembly that has a liquid-vapor discriminating valve and a pressure-holding valve.

Referring to the drawings, wherein like reference numbers refer to like components throughout the several views, FIG. 1 shows a vent valve assembly 10 designed to be mounted within a fuel tank 11 to control venting of fuel vapor from the fuel tank. The vent valve assembly 10 includes both a first valve, which in this embodiment is a liquid-vapor discriminating valve (LVDV) 12 and a second valve, which in this embodiment is a pressure-holding valve (PHV) 14. The vent valve assembly 10 is configured for ease of assembly along a single directional axis E with a reduced number of assembly steps. Additionally, the pressure-holding valve 14 is laterally-offset from the LVDV 12. This allows the LVDV 12 to be positioned closer to an upper wall of the fuel tank 11 when the vent valve assembly 10 is mounted within the fuel tank 11, resulting in the LVDV 12 closing at a higher fuel height.

The vent valve assembly 10 includes three housing components: a first housing component 20, a second housing component 22, and a third housing component 24. The first housing component 20 is also referred to as a lower housing component as it is lowest within the fuel tank 11 when the valve assembly 10 is mounted within the tank 11. The third housing component 24 is referred to herein as an upper housing component, as it is highest in the fuel tank 11 when the vent valve assembly 10 is mounted within the fuel tank 11. The second housing component 22 is referred to herein as a middle housing component or midplate, as it is sandwiched and trapped between the upper housing component 24 and the lower housing component 20 when the vent valve assembly 10 is assembled. The third housing component 24 mounts to a tank attachment device 27, which is configured to mount to the fuel tank 11. For example, the tank attachment device 27 can be a component that fits within an opening in the fuel tank 11 to support the vent valve assembly 10 to the upper wall of the fuel tank 11. Alternatively, the tank attachment device 27 can be a component that fuses to the fuel tank 11 when the material of the fuel tank 11 is relatively hot. Still further, the third housing component 24 could be configured to mount directly to the fuel tank 11 by heat fusion, as described with respect to the embodiments of FIG. 2, 4 or 5. It will be appreciated in light of the disclosure that the first housing component 20, the second housing component 22, and the third housing component 24 provide ornamental features aside from the functional features described herein.

The middle housing component 22 includes a first opening 26 above the LVDV 12 and a second opening 28 below the PHV 14. The second opening 28 is thus both laterally-spaced and axially-displaced from the first opening 26. The middle housing component 22 establishes a nonlinear flow path between the lower housing component 20 and the upper housing component 24 to direct vapor flow from the LVDV 12 to the PHV 14, thereby allowing the PHV 14 to be laterally-spaced from the LVDV 12 instead of directly above the LVDV 12.

The LVDV 12 includes a float 30 that is spring-biased toward the opening 26 by a spring 32. An opening 34 in the lower housing portion 20 allows vapor to pass through the lower housing portion 20 and through the opening 26. When liquid fuel level in the fuel tank 11 is at a predetermined level, the float 30 rises to block the opening 26. A peel-away device 35 hinged to the float 30 at pivot 36 blocks the opening 26 when the float 30 rises. The float 30 rises a predetermined amount 31 from the lowered position shown to a shutoff position in which the peel-away device 35 is against the middle housing component 22 at the opening 26. Because vapor is not vented, liquid level within the tank 11 can no longer rise and liquid fuel backs up within a fuel pipe to shut off a dispensing nozzle (not shown). If vapor pressure within the fuel tank 11 rises above a predetermined pressure, however, the balance of forces on the peel-away device 35 will cause it to peel away from the opening 26 sufficiently to relieve vapor pressure. Because vapor can be vented in this manner while liquid cannot, the LVDV 12 discriminates between vapor and liquid and is referred to as a liquid-vapor discriminating valve. Vapor then passes from the fuel tank vapor space through opening 34 and first opening 26 along vapor flow path indicated by arrow A. When liquid level within the tank 11 falls so that the float 30 is lowered as shown in FIG. 1, vapor also vents along the flow path of arrow A.

The PHV 14 includes a weighted ball 40 positioned within a retainer 42 formed by the middle housing component 22. Gravity causes the ball 40 to block the second opening 28 unless vapor pressure below the opening 28 rises to a predetermined level, at which point the ball 40 lifts, allowing vapor that has flowed along the vapor flow path from the first opening 26 to the second opening 28, as indicated by arrow B, to continue along the vapor flow path, as indicated by arrow C, through a vent valve assembly outlet 44 to a vapor recovery system. The middle housing portion 22 has a laterally-extending wall portion 46, axial-extending wall portions 48, 49 and laterally-extending wall portion 51 that define a nonlinear flow path from the first opening 26 to the second opening 28, directing vapor flow from the LVDV 12 to the PHV 14.

The upper housing component 24, middle housing component 22 and lower housing component 20 are configured with complementary features allowing them to be assembled to one another in a directionDalong a single axis E. That is, the vent valve assembly 10 assembles along a single axis parallel to the direction of extension of the ridges 50, 52. The axis E indicates the direction of assembly only (upward and/or downward along the axis E). Specifically, the upper housing component 24 has ridges 50 that press-fit to ridges 52 of the middle housing component 22 at various locations to form labyrinth seals 54. The ball 40 is placed on the middle housing component 22 within the retainer 42, and then the middle housing component 22 is moved toward the upper housing component 24 in direction D to secure the ridges 50 to the ridges 52. The ridges 50 are appropriately aligned with the ridges 52 when the middle housing component 22 is moved toward the upper housing component 20. Alternatively, the upper housing component 24 may be moved toward the middle housing component 22. It will be appreciated in light of the disclosure that the first housing component 20, the second housing component 22, and the third housing component 24 provide ornamental features including an overall impression aside from the functional features associated with their relative orientation described herein.

Next, the float 30 and spring 32 are supported on the lower housing component 20, and the lower housing component 20 is moved toward the middle housing component 22 in direction D. Alternatively, the middle housing component 22 may be moved downward toward the lower housing component 20 along axis E in a direction opposed to direction D. The lower housing component 20 also has a ridge 60 and a wall portion 62 that press-fits to wall portion 48 of the middle housing component 22 to form a labyrinth seal 64. The ridge 60 is appropriately aligned with the wall portion 62 when the lower housing component 20 is moved toward the middle housing component 22. When the lower housing component 20 is fit to the middle housing component 22, snap tabs extending from the upper housing component 24 fit within tab retainers extending from the lower housing component 20, to secure the upper housing component 24 to the lower housing component 20, with the middle housing component 22 sandwiched therebetween. Although not visible in the cross-sectional view of FIG. 1, substantially similar snap tabs 168 and tab retainers 170 are shown on the vent valve assembly 110 of FIG. 3. The function of snap tabs and retainers for connecting plastic components are readily understandable to a person of ordinary skill in the art. In all embodiments, the snap tabs 168 can be on either the first housing component or the third housing component, with the retainers on the other of the first housing component and the third housing component.

Alternatively, the vent valve assembly 10 can be assembled along axis E by first assembling the middle housing component 22 to the lower housing component 20, and then assembling the upper housing component 24 to the middle housing component 22. It will be appreciated in light of the disclosure that the middle housing component 22, the lower housing component 20, and the upper housing component 24 provide ornamental features aside from the functional features described herein.

Second Embodiment

Figure 2:
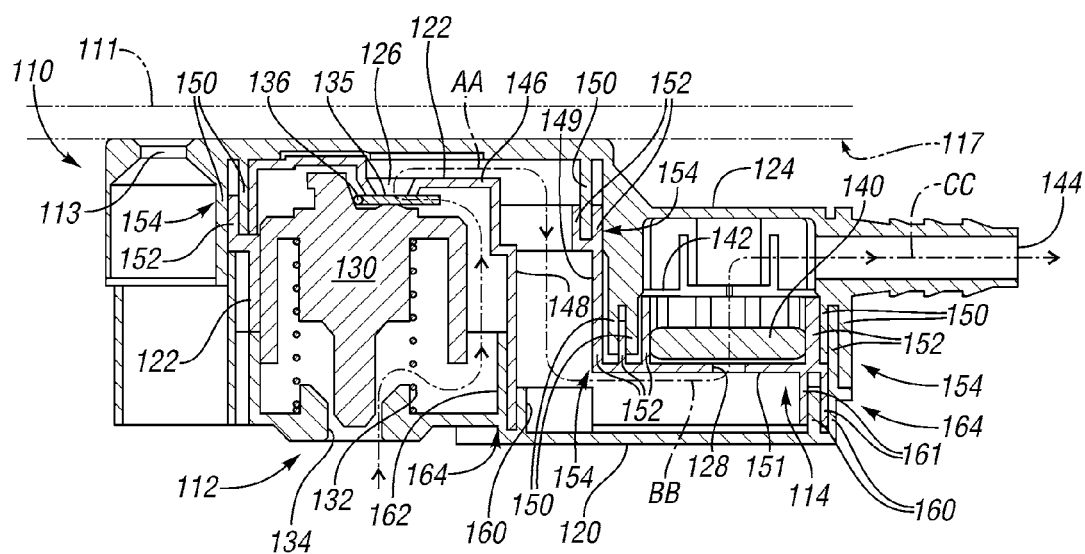
FIG. 2 is a schematic cross-sectional illustration of a second embodiment of a vent valve assembly that has a liquid-vapor discriminating valve and a pressure-holding valve.

FIG. 2 shows another embodiment of a vent valve assembly 110 that functions in a substantially similar manner as vent valve assembly 10. Vent valve assembly 110 is designed to be mounted within a fuel tank 111 to control venting of fuel vapor from the fuel tank 111. The vent valve assembly 110 includes both a liquid-vapor discriminating valve (LVDV) 112 and a pressure-holding valve (PHV) 114. The vent valve assembly 110 is configured for ease of assembly along a single axis EE with a reduced number of assembly steps. Additionally, the pressure-holding valve 114 is laterally-offset from the LVDV 112. This allows the LVDV 112 to be positioned closer to an upper wall of the fuel tank 111, resulting in the LVDV 112 closing at a higher fuel height.

The vent valve assembly 110 includes three housing components: a first housing component 120, a second housing component 122, and a third housing component 124. The first housing component 120 is also referred to as a lower housing component as it is lowest within the fuel tank 111 when the valve assembly 110 is mounted within the tank 111. The second housing component 122 is referred to herein as a middle housing component or midplate, as it is sandwiched and trapped between the upper housing component 124 and the lower housing component 120 when the vent valve assembly 110 is assembled. The third housing component 124 is referred to herein as an upper housing component, as it is highest in the fuel tank 111 when the vent valve assembly 110 is mounted within the fuel tank 111. The upper housing component 124 is configured to mount directly to the inner surface 117 of the upper wall of the fuel tank 111 by heat fusion. If the fuel tank 111 is a plastic material, the upper housing component 124 can be pressed against the fuel tank 111 when the fuel tank 111 is still relatively hot after injection molding. A portion of the fuel tank material 111 will flow into an opening 113 in the upper housing component 124, creating a fusion of the tank 111 to the upper housing component 124. The material within the opening 113 serves as a rivet. Additional similar openings in the upper housing component 124 for securing the upper housing component 124 to the fuel tank are also provided but are not visible in the cross-section of FIG. 2.

The middle housing component 122 includes a first opening 126 above the LVDV 112 and a second opening 128 below the PHV 114. The second opening 128 is both axially-displaced and laterally-displaced from the first opening 126. The middle housing component 122 establishes a nonlinear flow path between the lower housing component 120 and the upper housing component 124 to direct vapor flow from the LVDV 112 to the PHV 114, thereby allowing the PHV 114 to be laterally-spaced from the LVDV 112 instead of directly above the LVDV 112.

The LVDV 112 includes a float 130 that is spring-biased toward the opening 126 by a spring 132. An opening 134 in the lower housing component 120 allows vapor to pass through the lower housing portion 120 and through the opening 126. When liquid fuel level in the fuel tank 111 is at a predetermined level, the float 130 rises to block the opening 126, as shown. A peel-away device 135 hinged to the float 130 at pivot 136 blocks the opening 126 when the float 130 rises. The float 130 rises a predetermined amount from a lowered position to the shutoff position shown in which the peel-away device 135 is against the middle housing component 122 at the opening 126. Because vapor is not vented, liquid level within the tank 111 can no longer rise and liquid fuel backs up within a fuel pipe to shut off a dispensing nozzle (not shown). If vapor pressure within the fuel tank 111 rises above a predetermined pressure, however, the balance of forces on the peel-away device 135 will cause it to peel away from the opening 126 sufficiently to relieve vapor pressure. Vapor then passes from the fuel tank vapor space through opening 134 and first opening 126 along vapor flow path indicated by arrow AA. When liquid level within the tank 111 falls so that the float 130 is lowered, vapor also vents along the flow path of arrow AA.

The PHV 114 includes a weighted disc 140 positioned within a retainer 142 formed by the upper housing component 124. Gravity causes the disc 140 to block the second opening 128 unless vapor pressure below the opening 128 rises to a predetermined level, at which point the disc 140 lifts, allowing vapor that has flowed along the vapor flow path from the first opening 126 to the second opening 128, as indicated by arrow BB, to continue along the vapor flow path, as indicated by arrow CC, through a vent valve assembly outlet 144 to a vapor recovery system. The middle housing portion 122 has a laterally-extending wall portion 146, axial-extending wall portions 148, 149 and laterally-extending wall portion 151 that define a nonlinear flow path from the first opening 126 to the second opening 128, directing vapor flow from the LVDV 112 to the PHV 114.

The upper housing component 124, middle housing component 122 and lower housing component 120 are configured with complementary features allowing them to be assembled to one another in one direction DD along a single axis EE. That is, the vent valve assembly 110 assembles along a single axis parallel to the direction of extension of ridges 150, 152. The axis EE indicates the direction of assembly only (upward and/or downward along the axis EE). Specifically, the upper housing component 124 has ridges 150 that press-fit to ridges 152 of the middle housing component 122 at various locations to form labyrinth seals 154. The disc 140 is placed on the middle housing component 122, and then the middle housing component 122 is moved toward the upper housing component 124 in direction DD to secure the ridges 150 to the ridges 152. The ridges 150 are appropriately aligned with the ridges 152 when the middle housing component 122 is moved toward the upper housing component 124. Alternatively, the upper housing component 124 may be moved toward the middle housing component 122.

Figure 3:
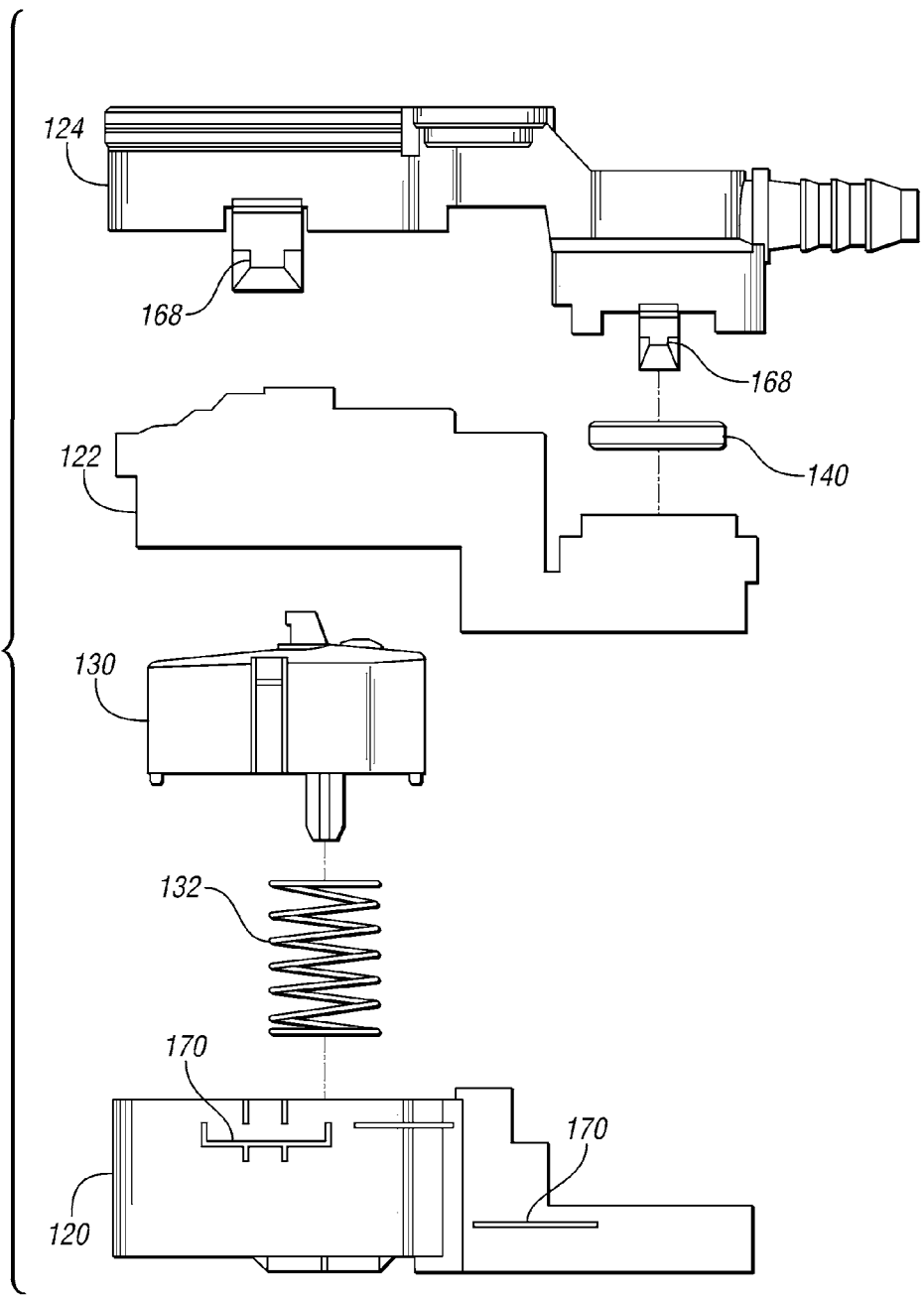
FIG. 3 is a schematic illustration in exploded view of the vent valve assembly of FIG. 2.

Next, the float 130 and spring 132 are supported on the lower housing component 120, and the lower housing component 120 is moved toward the middle housing component 122 in direction DD. Alternatively, the middle housing component 122 may be moved downward toward the lower housing component 120 along axis EE in a direction opposed to direction DD. The lower housing component 120 also has a ridge 160 and a wall portion 162 that press-fits to wall portion 148 of the middle housing component 122 to form a labyrinth seal 164. The ridge 160 is appropriately aligned with the wall portion 148 when the lower housing component 120 is moved toward the middle housing component 122. Ridges 160 of the lower housing component 120 also fit to the middle housing component 122 at ridges 161 to form another labyrinth seal 164. When the lower housing component 120 is fit to the middle housing component 122, snap tabs 168 extending from the upper housing component 124 fit within tab retainers 170 extending from the lower housing component 120, to secure the upper housing component 124 to the lower housing component 120, with the middle housing component 122 sandwiched therebetween. The snap tabs 168 and tab retainers 170 are shown in FIG. 3. FIG. 3 shows the components of the vent valve assembly 110 aligned for assembly as described.

Alternatively, the vent valve assembly 110 can be assembled along axis EE by first assembling the middle housing component 122 to the lower housing component 120, and then assembling the upper housing component 124 to the middle housing component 122. It will be appreciated in light of the disclosure that the middle housing component 122, the lower housing component 120, and the upper housing component 124 provide ornamental features aside from the functional features described herein.

Third Embodiment

Figure 4:
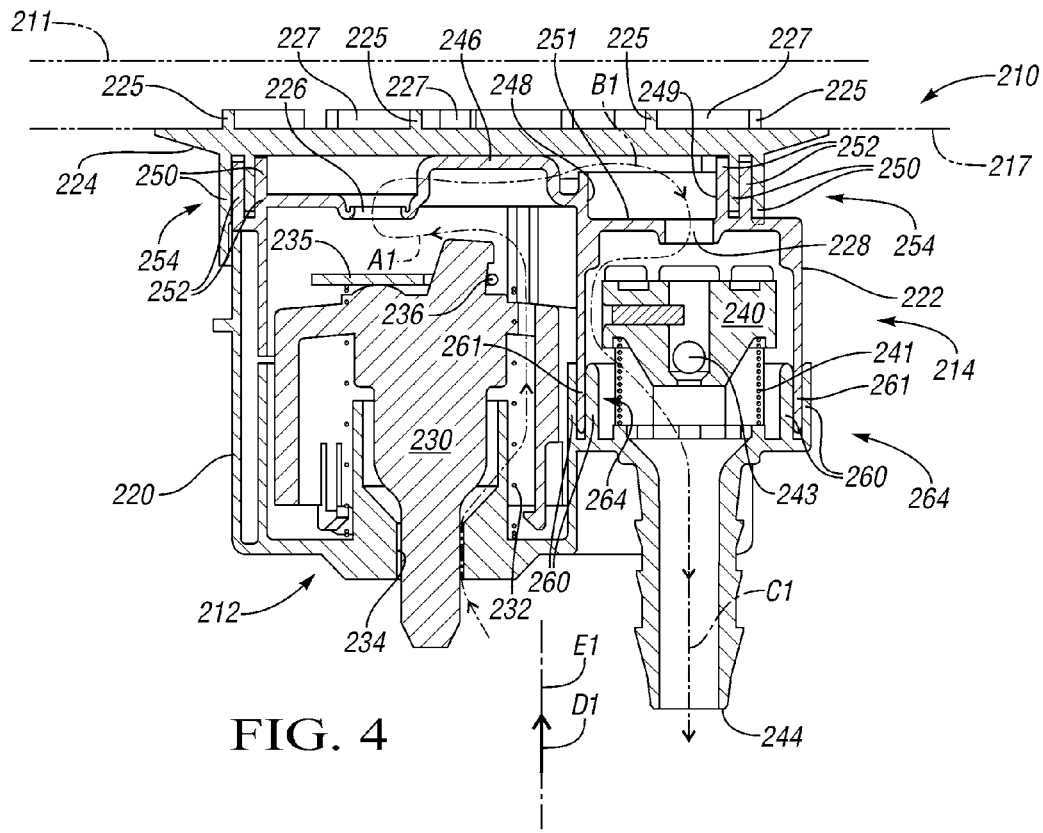
FIG. 4 is a schematic cross-sectional illustration of a third embodiment of a vent valve assembly that has a liquid-vapor discriminating valve and a pressure-holding valve.

FIG. 4 shows a third embodiment of a vent valve assembly 210 that functions in a substantially similar manner as vent valve assembly 10 of FIG. 1. Vent valve assembly 210 is designed to be mounted within a fuel tank 211 to control venting of fuel vapor from the fuel tank 211. The vent valve assembly 210 includes both a liquid-vapor discriminating valve (LVDV) 212 and a pressure-holding valve (PHV) 214. The vent valve assembly 210 is configured for ease of assembly along a single axis E1 with a reduced number of assembly steps. Additionally, the pressure-holding valve 214 is laterally-offset from the LVDV 212. This allows the LVDV 212 to be positioned closer to an upper wall of the fuel tank 211, resulting in the LVDV 212 closing at a higher fuel height.

The vent valve assembly 210 includes three housing components: a first housing component 220, a second housing component 222, and a third housing component 224. The first housing component 220 is also referred to as a lower housing component as it is lowest within the fuel tank 211 when the valve assembly 210 is mounted within the tank 211. The second housing component 222 is referred to herein as a middle housing component or midplate, as it is sandwiched and trapped between the upper housing component 224 and the lower housing component 220 when the vent valve assembly 210 is assembled. The third housing component 224 is referred to herein as an upper housing component, as it is highest in the fuel tank 211 when the vent valve assembly 210 is mounted within the fuel tank 211. The third housing component 224 mounts directly to the fuel tank 211. The third housing component 224 has extensions 225 forming cavities 227 in an upper surface. If the fuel tank 211 is plastic, when the fuel tank 211 is relatively hot, the upper housing component 224 can be pressed to an inner surface 217 of an upper wall of the fuel tank 211, causing material of both the upper housing component 224 and the fuel tank 211 to fuse together, with material of the fuel tank 211 filling the cavities 227, forming an integral joint. It will be appreciated in light of the disclosure that the first housing component 220, the second housing component 222, and the third housing component 224 provide ornamental features aside from the functional features described herein.

The middle housing component 222 includes a first opening 226 above the LVDV 212 and a second opening 228 above the PHV 214, rather than below as in the first two embodiments. The second opening 228 is both axially-displaced and laterally-displaced from the first opening 226. The middle housing component 222 establishes a nonlinear flow path between the lower housing component 220 and the upper housing component 224 to direct vapor flow from the LVDV 212 to the PHV 214, thereby allowing the PHV 214 to be laterally-spaced from the LVDV 212 instead of directly above the LVDV 212.

The LVDV 212 includes a float 230 that is spring-biased toward the opening 226 by a spring 232. An opening 234 in the lower housing component 220 allows vapor to pass through the lower housing portion 220 and through the opening 226. When liquid fuel level in the fuel tank 211 is at a predetermined level, the float 230 rises to block the opening 226. A peel-away device 235 hinged to the float 230 at pivot 236 blocks the opening 226 when the float 230 rises. The float 230 rises a predetermined amount from a lowered position shown to the shutoff position in which the peel-away device 235 is against the middle housing component 222 at the opening 226. Because vapor is not vented, liquid level within the tank 211 can no longer rise and liquid fuel backs up within a fuel pipe to shut off a dispensing nozzle (not shown). If vapor pressure within the fuel tank 211 rises above a predetermined pressure, however, the balance of forces on the peel-away device 235 will cause it to peel away from the opening 226 sufficiently to relieve vapor pressure. Vapor then passes from the fuel tank vapor space through opening 234 and first opening 226 along vapor flow path indicated by arrow A1. The middle housing component 222 has a wall portion 246 that forms an island. Forward of the cross-section area shown, the middle housing component 222 slopes downward from the wall portion 246, similar to the slope shown on either end of wall portion 246. The opening 226 is in fluid communication with the opening 228 around all sides of the wall portion 246. This allows vapor flow from the opening 226 to the opening 228. When liquid level within the tank 211 falls so that the float 230 is lowered as shown, vapor also vents along the flow path of arrow A1.

The PHV 214 includes a spring-biased valve body 240 biased to a closed position (not shown) by a spring 241 to block the second opening 228 unless vapor pressure above the opening 228 rises to a predetermined level, at which point the valve body 240 compresses the spring 241 as shown, allowing vapor that has flowed along the vapor flow path from the first opening 226 to the second opening 228, as indicated by arrow B1, to continue along the vapor flow path, as indicated by arrow C1, through a vent valve assembly outlet 244 to a vapor recovery system. A ball valve 243 within the valve body 240 allows over-vacuum relief of the fuel tank 211 by permitting vapor flow into the fuel tank 211 through outlet 244 when a pressure differential between the pressure at the outlet 244 and a pressure in the tank 211 is above a predetermined level.

The middle housing portion 222 has the laterally-extending wall portion 246 forming the island, axial-extending wall portions 248, 249 and laterally-extending wall portion 251 that define a nonlinear flow path from the first opening 226 to the second opening 228, directing vapor flow from the LVDV 212 to the PHV 214.

The upper housing component 224, middle housing component 222 and lower housing component 220 are configured with complementary features allowing them to be assembled to one another in one direction D1 along a single axis E1. Specifically, the upper housing component 224 has ridges 250 that press-fit to ridges 252 of the middle housing component 222 at various locations to form labyrinth seals 254 when the middle housing component 222 is moved toward the upper housing component 224 in a direction D1 along axis E1. The valve body 240 and spring 241 are placed on the lower housing component 220, and the float 230 and spring 232 are also placed on the lower housing component 220. The lower housing component 220 is moved toward the middle housing component 222. The lower housing component 220 also has ridges 260 that press-fit to wall portions 261 of the middle housing component 222 to form labyrinth seals 264. The ridges 260 are appropriately aligned with the wall portions 261 when the lower housing component 220 is moved toward the middle housing component 222. When the lower housing component 220 is fit to the middle housing component 222, snap tabs extending from the upper housing component 224 fit within tab retainers extending from the lower housing component 222, to secure the upper housing component 224 to the lower housing component 220, with the middle housing component 222 sandwiched therebetween. The snap tabs and tab retainers are substantially similar to those shown in FIG. 3.

Alternatively, the vent valve assembly 210 can be assembled along axis E1 but in an opposing direction to direction D1 by first assembling the middle housing component 222 to the lower housing component 220, and then assembling the upper housing component 224 to the middle housing component 222.

Fourth Embodiment

Figure 5:
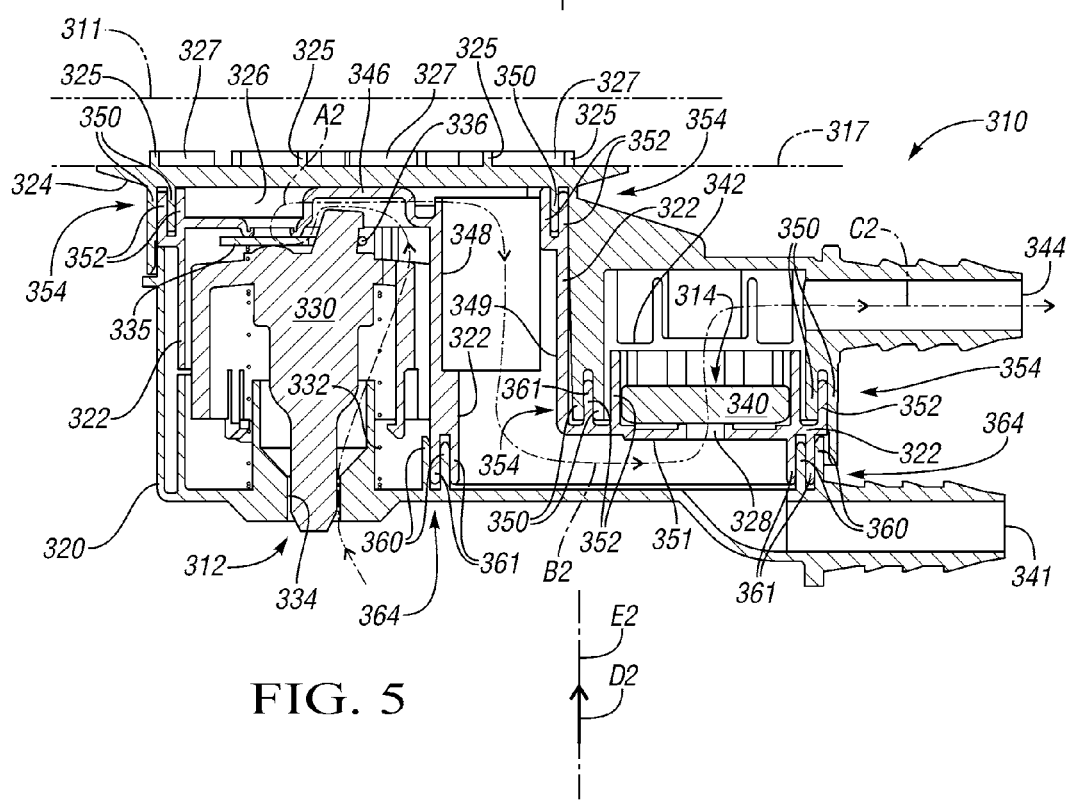
FIG. 5 is a schematic cross-sectional illustration of a fourth embodiment of a vent valve assembly that has a liquid-vapor discriminating valve and a pressure-holding valve.

FIG. 5 shows another embodiment of a vent valve assembly 310 that functions in a substantially similar manner as vent valve assembly 10. Vent valve assembly 310 is designed to be mounted within a fuel tank 311 to control venting of fuel vapor from the fuel tank 311. The vent valve assembly 310 includes both a liquid-vapor discriminating valve (LVDV) 312 and a pressure-holding valve (PHV) 314. The vent valve assembly 310 is configured for ease of assembly along a single axis E2 with a reduced number of assembly steps. Additionally, the pressure-holding valve 314 is laterally-offset from the LVDV 312. This allows the LVDV 312 to be positioned closer to an upper wall of the fuel tank 311, resulting in the LVDV 312 closing at a higher fuel height.

The vent valve assembly 310 includes three housing components: a first housing component 320, a second housing component 322, and a third housing component 324. The first housing component 320 is also referred to as a lower housing component as it is lowest within the fuel tank 311 when the valve assembly 310 is mounted within the tank 311. The second housing component 322 is referred to herein as a middle housing component or midplate, as it is sandwiched and trapped between the upper housing component 324 and the lower housing component 320 when the vent valve assembly 310 is assembled. The third housing component 324 is referred to herein as an upper housing component, as it is highest in the fuel tank 311 when the vent valve assembly 310 is mounted within the fuel tank 311. The upper housing component 324 is configured to mount directly to the inner surface 317 of the upper wall of the fuel tank 311 by heat fusion. If the fuel tank 311 is a plastic material, the upper housing component 324 can be mounted directly to the fuel tank 311 if pressed against the fuel tank 311 when the fuel tank 311 is still relatively hot after injection molding. The third housing component 324 has extensions 325 forming cavities 327 in an upper surface. If the fuel tank 311 is plastic, when the fuel tank 311 is relatively hot, the upper housing component 324 can be pressed to the fuel tank 311, causing material of both the upper housing component 324 and the fuel tank 311 to fuse together, with material of the fuel tank 311 filling the cavities 327, forming an integral joint. It will be appreciated in light of the disclosure that the first housing component 320, the second housing component 322, and the third housing component 324 provide ornamental features aside from the functional features described herein.

The middle housing component 322 includes a first opening 326 above the LVDV 312 and a second opening 328 below the PHV 314. The second opening 328 is both axially-displaced and laterally-displaced from the first opening 326. The middle housing component 322 establishes a nonlinear flow path between the lower housing component 320 and the upper housing component 324 to direct vapor flow from the LVDV 312 to the PHV 314, thereby allowing the PHV 314 to be laterally-spaced from the LVDV 312 instead of directly above the LVDV 312.

The LVDV 312 includes a float 330 that is spring-biased toward the opening 326 by a spring 332. An opening 334 in the lower housing component 320 allows vapor to pass through the lower housing portion 320 and through the opening 326. When liquid fuel level in the fuel tank 311 is at a predetermined level, the float 330 rises to block the opening 326, as shown. A peel-away device 335 hinged to the float 330 at pivot 336 blocks the opening 326 when the float 330 rises. The float 330 rises a predetermined amount from a lowered position to the shutoff position shown in which the peel-away device 335 is against the middle housing component 322 at the opening 326. Because vapor is not vented, liquid level within the tank 311 can no longer rise and liquid fuel backs up within a fuel pipe to shut off a dispensing nozzle (not shown). If vapor pressure within the fuel tank 311 rises above a predetermined pressure, however, the balance of forces on the peel-away device 335 will cause it to peel-away from the opening 326 sufficiently to relieve vapor pressure. Vapor then passes from the fuel tank vapor space through opening 334 and first opening 326 along vapor flow path indicated by arrow A2. When liquid level within the tank 311 falls so that the float 330 is lowered, vapor also vents along the flow path of arrow A2. The middle housing component 322 has a wall portion 346 that forms an island. Forward of the cross-section area shown, the middle housing component 322 slopes downward from the wall portion 346, similar to the slope shown on either end of wall portion 346. The opening 326 is in fluid communication with the opening 328 around all sides of the wall portion 346. This allows vapor flow from the opening 326 to the opening 328. When liquid level within the tank 311 falls so that the float 330 is lowered as shown, vapor also vents along the flow path of arrow A2.

The PHV 314 includes a weighted disc 340 positioned within a retainer 342 formed by the upper housing component 324. Gravity causes the disc 340 to block the second opening 328 unless vapor pressure below the opening 328 rises to a predetermined level, at which point the disc 340 lifts, allowing vapor that has flowed along the vapor flow path from the first opening 326 to the second opening 328, as indicated by arrow B2, to continue along the vapor flow path, as indicated by arrow C2, through a vent valve assembly outlet 344 to a vapor recovery system. The middle housing portion 322 has axial-extending wall portions 348, 349 and laterally-extending wall portion 351 that define a nonlinear flow path from the first opening 326 to the second opening 328, directing vapor flow from the LVDV 312 to the PHV 314. The lower housing portion 320 has another inlet 341 that is in communication with a separate valve or vapor source to vent through the PHV 314.

The upper housing component 324, middle housing component 322 and lower housing component 320 are configured with complementary features that allow them to be assembled to one another in one direction D2 along a single axis E2. That is, the vent valve assembly 310 assembles along a single axis parallel to the direction of extension of ridges 350, 352. The axis E2 indicates the direction of assembly only (upward and/or downward along the axis E2). Specifically, the upper housing component 324 has ridges 350 that press-fit to ridges 352 of the middle housing component 322 at various locations to form labyrinth seals 354. The disc 340 is placed on the middle housing component 322, and then the middle housing component 322 is moved toward the upper housing component 324 in direction D2 to secure the ridges 350 to the ridges 352. The ridges 350 are appropriately aligned with the ridges 352 when the middle housing component 322 is moved toward the upper housing component 324. Alternatively, the upper housing component 324 may be moved toward the middle housing component 322.

Next, the float 330 and spring 332 are supported on the lower housing component 320, and the lower housing component 320 is moved toward the middle housing component 322 in direction D2. Alternatively, the middle housing component 322 may be moved downward toward the lower housing component 320 along axis E2 in a direction opposed to direction D2. The lower housing component 320 also has ridges 360 that press-fit to ridges 361 of the middle housing component 322 to form a labyrinth seal 364. The ridges 360 are appropriately aligned with the ridges 361 when the lower housing component 320 is moved toward the middle housing component 322. When the lower housing component 320 is fit to the middle housing component 322, snap tabs extending from the upper housing component fit within tab retainers extending from the lower housing component, to secure the upper housing component 324 to the lower housing component 320, with the middle housing component 322 sandwiched therebetween. The snap tabs and tab retainers are substantially similar to tabs 168 and retainers 170 shown in the embodiment of FIG. 3. Alternatively, the vent valve assembly 310 can be assembled along axis E2 by first assembling the middle housing component 322 to the lower housing component 320, and then assembling the upper housing component 324 to the middle housing component 322.

Fifth Embodiment

Figure 6:
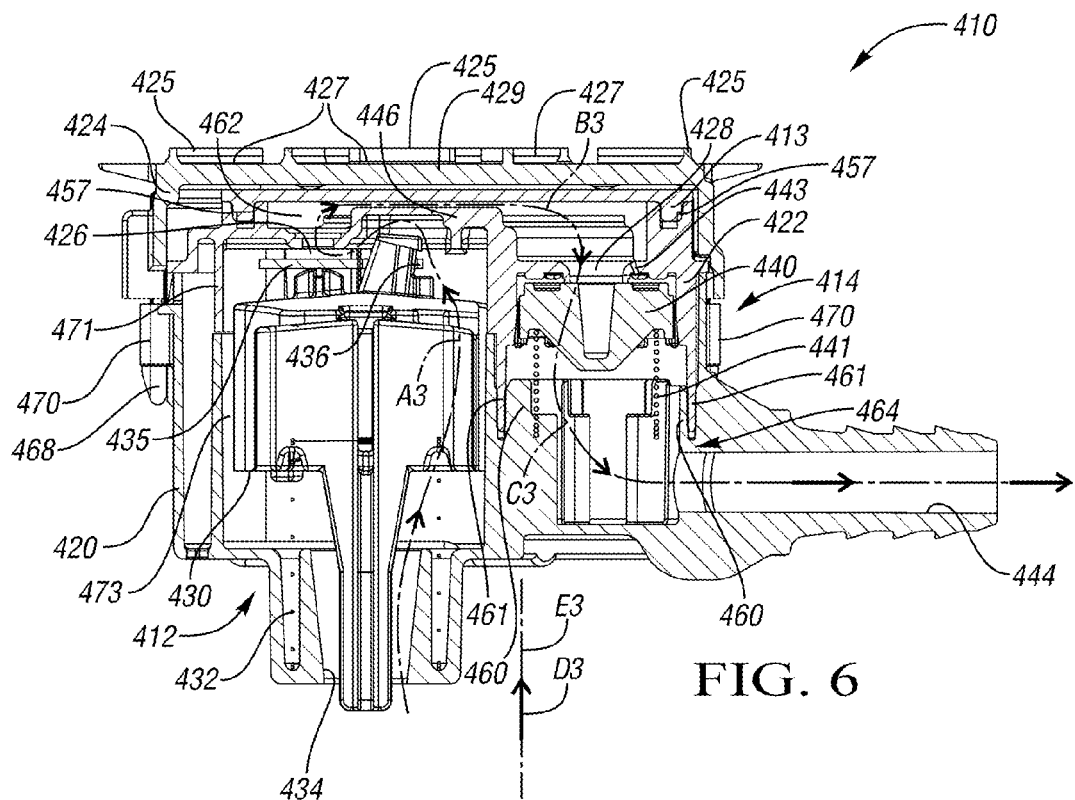
FIG. 6 is a schematic illustration in partial cross-sectional view of a fourth embodiment of a vent valve assembly that has a liquid-vapor discriminating valve and a pressure-holding valve.

FIG. 6 shows a fifth embodiment of a vent valve assembly 410 that functions in a substantially similar manner as vent valve assembly 10 of FIG. 1. Vent valve assembly 410 is designed to be mounted within a fuel tank 411 (shown in fragmentary cross-sectional view in FIG. 7) to control venting of fuel vapor from the fuel tank 411. The vent valve assembly 410 includes both a liquid-vapor discriminating valve (LVDV) 412 and a pressure-holding valve (PHV) 414, also referred to herein as a first valve and a second valve, respectively. The vent valve assembly 410 is configured for ease of assembly along a single axis E3 with a reduced number of assembly steps. Additionally, the pressure-holding valve 414 is laterally-offset from the LVDV 412. This allows the LVDV 412 to be positioned closer to an upper wall of the fuel tank 411, resulting in the LVDV 412 closing at a higher fuel height.

The vent valve assembly 410 includes an inner cap 413 as well as three housing components: a first housing component 420, a second housing component 422, and a third housing component 424. The first housing component 420 is also referred to as a lower housing component as it is lowest within the fuel tank 411 when the valve assembly 410 is mounted within the tank 411. The second housing component 422 is referred to herein as a middle housing component or midplate, as it is sandwiched and trapped between the upper housing component 424 and the lower housing component 420 when the vent valve assembly 410 is assembled. The third housing component 424 is referred to herein as an upper housing component or as an outer cap, as it is highest in the fuel tank 411 when the vent valve assembly 410 is mounted within the fuel tank 411. The third housing component 424 can mount directly to an inner surface 417 of a fuel tank member such as the upper wall of the fuel tank 411 or a tank attachment device similar to tank attachment device 27 of FIG. 1.

Figure 7:
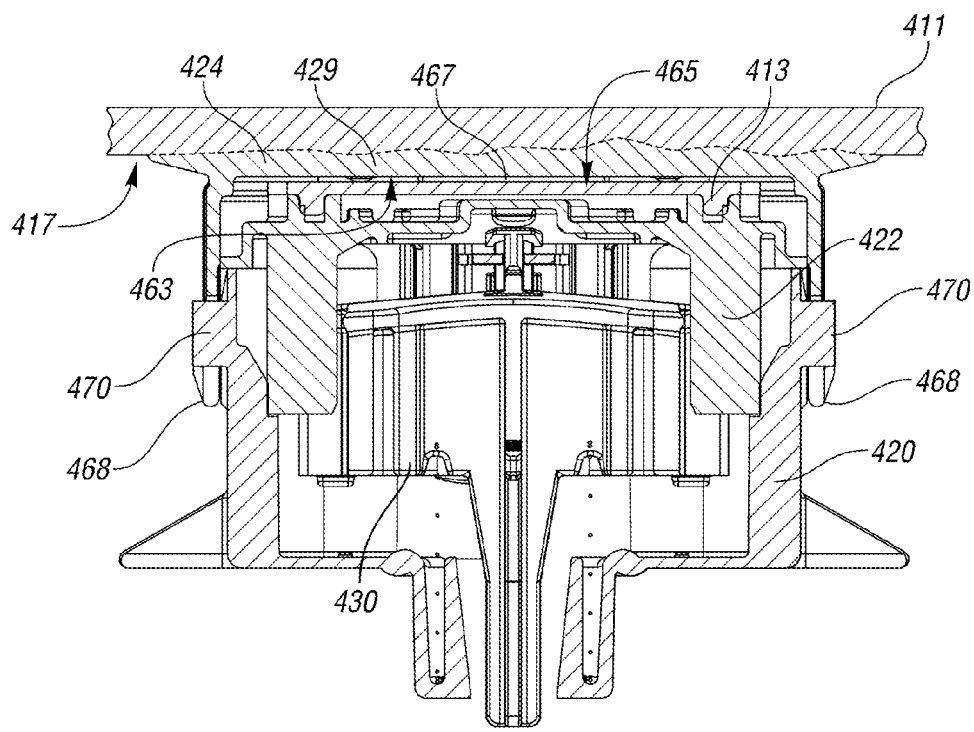
FIG. 7 is a schematic illustration in partial cross-sectional view of the vent valve assembly of FIG. 6 taken at lines 7-7 in FIG. 8.
Figure 8:
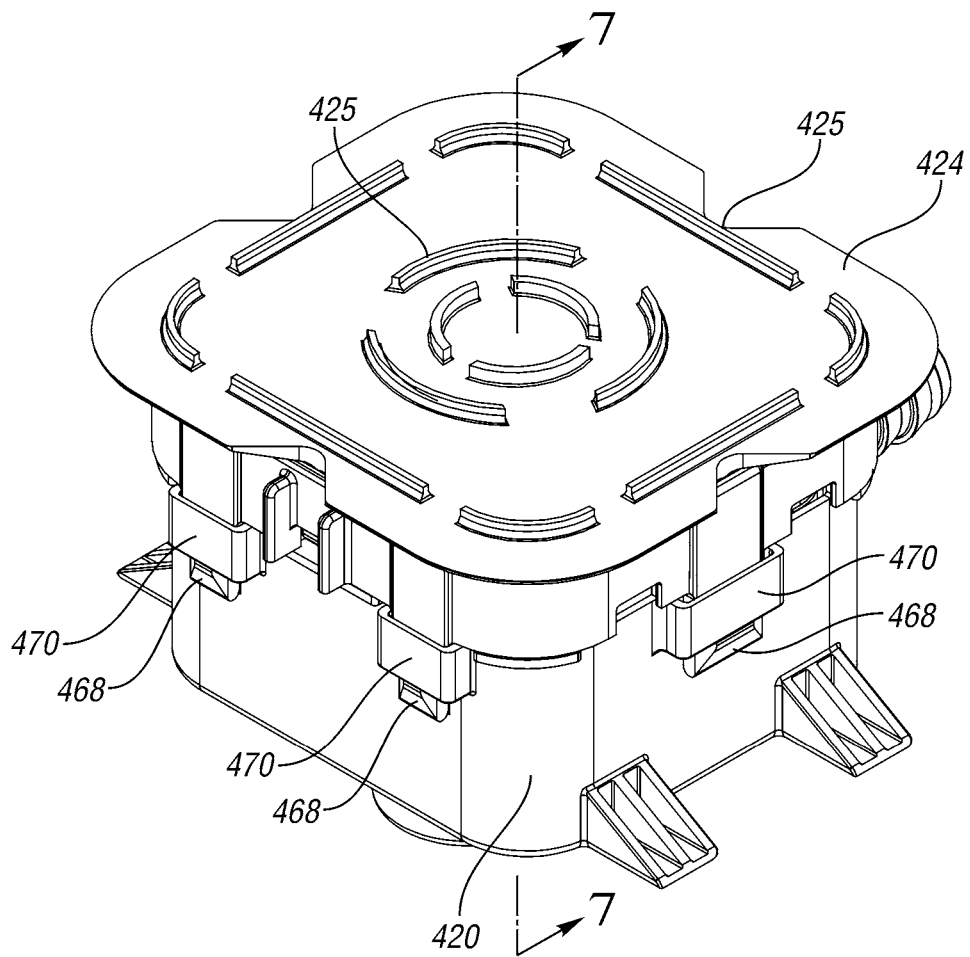
FIG. 8 is a schematic illustration in perspective view of the vent valve assembly of FIG. 6.
Figure 9:
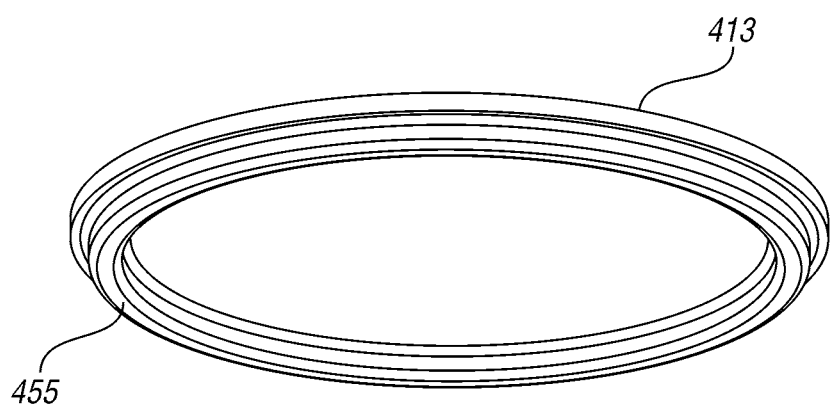
FIG. 9 is a schematic illustration in perspective view of an inner cap of the vent valve assembly of FIG. 6.

The third housing component 424 has a mounting portion 429 with extensions 425 forming cavities 427 in an upper surface. If the fuel tank 411 is plastic, when the fuel tank 411 is relatively hot, the upper housing component 424 can be pressed to an inner surface 417 of an upper wall of the fuel tank 411, causing material of both the upper housing component 424 and the fuel tank 411 to fuse together, with material of the fuel tank 411 filling the cavities 427 as shown in FIG. 7, forming an integral joint. It will be appreciated in light of the disclosure that the inner cap 413, the first housing component 420, the second housing component 422, and the third housing component 424 provide ornamental features aside from the functional features described herein.

The middle housing component 422 includes a first opening 426 above the LVDV 412 and a second opening 428 above the PHV 414, rather than below as in the embodiments of FIGS. 1 and 2. The second opening 428 is both axially-displaced and laterally-displaced from the first opening 426. The middle housing component 422 establishes a nonlinear flow path between the lower housing component 420 and the inner cap 413 to direct vapor flow from the LVDV 412 to the PHV 414, thereby allowing the PHV 414 to be laterally-spaced from the LVDV 412 instead of directly above the LVDV 412.

The LVDV 412 includes a float 430 that is spring-biased toward the opening 426 by a spring 432. An opening 434 in the lower housing component 420 allows vapor to pass through the lower housing portion 420 and through the opening 426. When liquid fuel level in the fuel tank 411 is at a predetermined level, the float 430 rises to block the opening 426. A peel-away device 435 hinged to the float 430 at pivot 436 blocks the opening 426 when the float 430 rises. The float 430 rises a predetermined amount from a lowered position shown to the shutoff position in which the peel-away device 435 is against the middle housing component 422 at the opening 426. The axial position of the first opening 426 is closer to the inner cap 413 than the second opening 428. In fact, the float 430 and the peel away valve 435 of the LVDV 412 move past the axial position of the second opening 428 when the float 430 rises to the shutoff position. Because vapor is not vented, liquid level within the tank 411 can no longer rise and liquid fuel backs up within a fuel pipe to shut off a dispensing nozzle (not shown). If vapor pressure within the fuel tank 411 rises above a predetermined pressure, however, the balance of forces on the peel-away device 435 will cause it to peel away from the opening 426 sufficiently to relieve vapor pressure. Vapor then passes from the fuel tank vapor space through opening 434 and first opening 426 along vapor flow path indicated by arrow A3. The middle housing component 422 has a wall portion 446 that forms an island. Forward of the cross-section area shown, the middle housing component 422 slopes downward from the wall portion 446, similar to the slope shown on either end of wall portion 446 as is apparent in FIG. 10. The first opening 426 is in fluid communication with the second opening 428 around all sides of the wall portion 446. This allows vapor flow from the first opening 426 to the second opening 428. When liquid level within the tank 411 falls so that the float 430 is lowered as shown in FIG. 6, vapor also vents along the flow path of arrow A3.

The PHV 414 includes a spring-biased valve body 440 biased to a closed position (shown) by a spring 441 to block the second opening 428 unless vapor pressure above the second opening 428 rises to a predetermined level, at which point the valve body 440 compresses the spring 441, allowing vapor that has flowed along the vapor flow path A3 from the first opening 426 to the second opening 428, as indicated by arrow B3, to continue along the vapor flow path, as indicated by arrow C3, through a vent valve assembly outlet 444 to a vapor recovery system. Although the valve body 440 is not lowered in FIG. 6 and the second opening 428 is therefore blocked, vapor flow is shown for purposes of illustration flowing through the second opening 428 as it would if the valve body 440 were lowered. A small bypass vent opening 443 in the second housing component 422 adjacent the second opening 428 allows some pressure and vacuum relief of the fuel tank 411 even if the second opening 428 is blocked by the valve body 440 by permitting vapor flow between the fuel tank 411 and outlet 444 through the bypass vent opening 443, such as when a pressure differential between the pressure at the outlet 444 and a pressure in the tank 411 is above a predetermined level.

Figure 10:
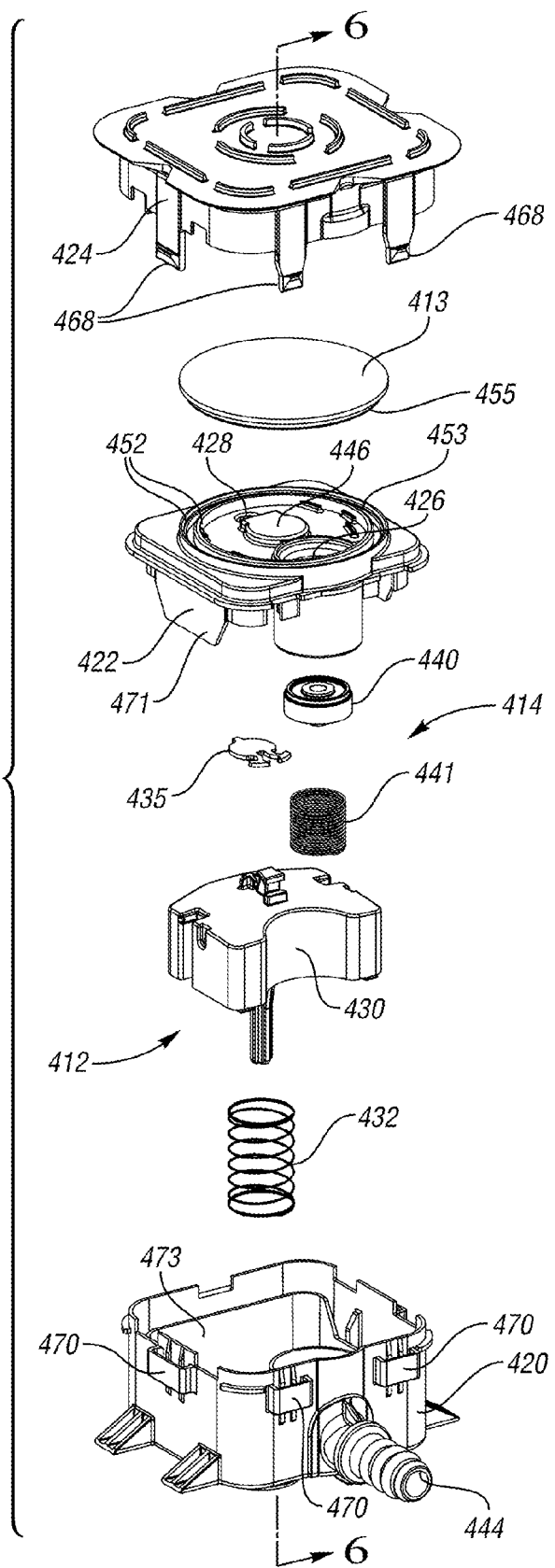
FIG. 10 is a schematic illustration in exploded perspective view of the vent valve assembly of FIG. 6.

As best shown in FIG. 10, the middle housing component 422 has the laterally-extending wall portion 446 forming the island, as well as axially extending continuous and concentric circular ridges 452. A continuous circular recess 453 is formed by the ridges 452 between the ridges 452 that extend toward the inner plate 413 and the mounting portion 429 of the third housing component 424. The middle housing component 422 is open above the first and second openings 426, 428, and therefore requires another component to enclose a space above the openings 426, 428 to establish with the first and second housing components 420, 422 the entire nonlinear flow path from the first opening 426 to the second opening 428, directing vapor flow from the LVDV 412 to the PHV 414. The inner cap 413 is configured with a continuous circular flange 455 that extends toward the second housing component 422 and away from the mounting portion 429, and is configured to fit in the recess 453 between the ridges 452 when attached to the second housing component 422. The inner cap 413 and the second housing component 422 can both be plastic, in which case the inner cap 413 can be secured to the second housing component 422 at the ridges 452 by sonic welding. Other plastic joining methods can be used instead of sonic welding, such as vibration welding, laser welding, infrared welding, the use of an O-ring, a labyrinth seal, or snaps. With any such form of attachment, such as with the sonic welding process, a continuous sealed joint 457 is established at the recess 453. The inner cap 413 then cooperates with the second housing component 422 to enclose an upper extent of a vapor cavity 462 (indicated in FIG. 6) on the opposite side of the second housing component 422 from the valve bodies 430, 440.

After the inner cap 413 is joined to the second housing component 422, the third housing component 424 can be placed over the inner cap 413 and secured to the first housing component 420, as shown in FIG. 7. Specifically, snap tabs 468 extending from the third housing component 424 fit within tab retainers 470 extending from the first housing component 422, to secure the third housing component 424 to the first housing component 420, with the inner cap 413, the second housing component 422, and the valves 412, 414 sandwiched therebetween.

Referring to FIG. 7, it is apparent that when the third housing component 424 is secured directly to the inner surface 417 of the fuel tank 411, such as by heat fusion, and the cap 413 is joined to the second housing component 422, such as by sonic welding, an inner surface 463 of the mounting portion 429 of the third housing component 424 extends over but is slightly spaced from the inner cap 413. The third housing component 424 thus functions as an outer cap of the valve assembly 410. If the second housing component 422 rather than the inner cap 413 were to be joined to the third housing component 424 to enclose the flow path, a joint between the second housing component 422 and the third housing component 424 would need to be sufficient to maintain a sealing relationship between the second housing component 422 and the third housing component 424 even under temperature-induced stress due to dimensional changes of the third housing component 424 caused by heat fusion of the third housing component 424 to the tank 411. However, by providing an inner cap 413 joined to the second housing component 422 at a joint that is isolated from the third housing component 424, attachment processes of the third housing component 424 to the fuel tank 411, and any associated dimensional changes of the third housing component 424 do not affect the joint 457. It is apparent in FIG. 7 that an upper surface 465 of the inner cap 413 facing an inner surface 463 off the mounting portion 429 of the third housing component 424 is spaced from the inner surface 463 such that a small gap 467 exists between the inner cap 413 and the mounting portion 429. In other words, the inner cap 413 is not directly attached to the third housing component 424. Stresses on the third housing component 424 are thus largely isolated from the inner cap 413. Additionally, because the third housing component 424 does not form or define the vapor flow path, the use of differently configured third housing components is enabled. For example, a third housing component with a differently configured mounting portion for interfacing with a differently configured fuel tank could be used, while maintaining the same configurations of the remaining components of the vent valve assembly 410, thus achieving economies of scale The upper housing component 424, middle housing component 422 and lower housing component 420 are configured with complementary features allowing them to be assembled to one another in one direction D3 along the single axis E3. Specifically, the upper housing component 424 has tabs 468 that snap into retainers 470 of the lower housing component 420. Alternatively, the upper housing component 424 could have retainers 470 and the lower housing component 420 could have tabs 468. Other types of complementary features could be used to secure the third housing component 424 to the first housing component 422.

The valve body 440 and spring 441 are placed on the lower housing component 420, and the float 430 and spring 432 are also placed on the lower housing component 420. The lower housing component 420 is moved toward the middle housing component 422. The lower housing component 420 also has ridges 460 that press-fit to wall portions 461 of the middle housing component 422 to form labyrinth seals 464. The ridges 460 are appropriately aligned with the wall portions 461 when the lower housing component 420 is moved toward the middle housing component 422. Additionally, side walls 471 of the middle housing component 422 are supported on side walls 473 of the lower housing component 420. The side walls 471, 473 are also shown in FIG. 10.

Next, the inner cap 413 is secured to the second housing component 422 to establish a sealed joint 457 and to define and enclose the vapor flow path A3. The third housing component 424 can then be snap-fit to the first housing component

420. The third housing component 424 is then attached to the inner surface 417 of the fuel tank 411, such as by heat fusion. With this arrangement, the inner cap 413 forms the upper boundary of the flow path A3 from the first opening 426 to the second opening 428.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vent valve assembly comprising:
a first housing component;
a second housing component secured to the first housing component;
a third housing component;
an inner cap joined to the second housing component at a sealed joint;
a first valve;
a second valve;
wherein the third housing component secures to the first housing component such that the inner cap, the second housing component, the first valve and the second valve are surrounded by the first and third housing components; and wherein the first and the second housing components and the inner cap define a vapor flow path that directs vapor from the first valve to the second valve;
wherein the second housing component defines a first opening that functions as a vapor vent of the first valve; and wherein the second housing component defines a second opening that functions as a vapor vent of the second valve; and wherein vapor flows from the first opening to the second opening.

2. The vent valve assembly of claim 1, wherein the second valve is laterally-spaced from the first valve; and wherein the first, the second, and the third housing components and the inner cap are configured to assemble together along one directional axis.

3. The vent valve assembly of claim 1, wherein the first valve is configured to block the first opening in the second housing component when the first valve is lifted by a predetermined amount; and wherein the second valve is configured to prevent vapor that has passed through the first opening from passing through the second opening in the second housing component when pressure of the vapor is below a predetermined pressure.

4. The vent valve assembly of claim 1, wherein the second opening is axially-displaced from the first opening so that the vapor flow path through the vent valve assembly is nonlinear.

5. The vent valve assembly of claim 1, wherein one of the first housing component and the third housing component has tab retainers; and wherein the other of the first housing component and the third housing component has snap tabs extending therefrom and configured to snap into and be retained by the tab retainers to attach the first housing component to the third housing component.

6. The vent valve assembly of claim 1 in combination with a fuel tank member, wherein the third housing component is configured to be secured directly to an inner surface of the fuel tank member.

7. The vent valve assembly of claim 1, wherein the second housing component has continuous concentric ridges that form a recess between the ridges; and wherein the inner cap has a continuous flange fit to the ridges in the recess.

8. The vent valve assembly of claim 7, wherein the third housing component is a one-piece, unitary component that includes a mounting portion that extends over the inner cap without securing to the inner cap.

9. The vent valve assembly of claim 8, wherein the continuous ridges extend toward the mounting portion; and wherein the continuous flange extends away from the mounting portion.

10. The vent valve assembly of claim 8, wherein at least a portion of a surface of the inner cap facing the mounting portion is spaced from the mounting portion.

11. A vent valve assembly for a fuel tank comprising:
a housing including a first, a second, and a third housing component;
a liquid-vapor discriminating valve;
a pressure-holding valve;
wherein the first, second, and third housing components are configured to assemble to one another in one direction, with the second housing component sandwiched between the first and third housing components and the pressure-holding valve displaced laterally from the liquid-vapor discriminating valve;
wherein the liquid-vapor discriminating valve is configured to block flow that passes through the first housing component from passing through a first opening in the second housing component when a float of the liquid-vapor discriminating valve is lifted by a predetermined amount to a shutoff position;
wherein the pressure-holding valve is configured to prevent vapor that has passed through the first opening from passing through a second opening in the second housing component when pressure of the vapor is below a predetermined pressure;
wherein the liquid-vapor discriminating valve moves past an axial position of the second opening when the liquid-vapor discriminating valve is lifted to the shutoff position;
wherein the first housing component and the second housing component are configured with complementary features that interfit to sealingly secure the first housing component to the second housing component; and
wherein the first housing component and the third housing are configured with complementary retaining features that secure the first housing component to the third housing component independently of the second housing component.

12. The vent valve assembly of claim 11, further comprising:
an inner cap joined to the second housing component at a sealed joint;
wherein the third housing component secures to the first housing component such that the inner cap, the second housing component, the first valve and the second valve are surrounded by the first and third housing components, the third housing component thereby functioning as an outer cap; and wherein the first and the second housing components and the inner cap define a vapor flow path that redirects vapor from the first valve to the second valve.

13. A vent valve assembly comprising:
a first housing component;
a second housing component secured to the first housing component;
a third housing component;
an inner cap joined to the second housing component at a sealed joint;
a first valve;
a second valve;

wherein the third housing component secures to the first housing component such that the inner cap, the second housing component, the first valve and the second valve are surrounded by the first and third housing components; and wherein the first and the second housing components and the inner cap define a vapor flow path that directs vapor from the first valve to the second valve; wherein the second valve is laterally-spaced from the first valve; and wherein the first, the second, and the third housing components and the inner cap are configured to assemble together along one directional axis; and wherein the first valve and the second valve are supported on the first housing component between the first housing component and the second housing component.

14. The vent valve assembly of claim 13, wherein the first housing component and the second housing component are configured with complementary features that interfit to form a labyrinth seal to hold the first housing component to the second housing component.

15. The vent valve assembly of claim 13, wherein one of the first housing component and the third housing component has tab retainers; and wherein the other of the first housing component and the third housing component has snap tabs extending therefrom and configured to snap into and be retained by the tab retainers to attach the first housing component to the third housing component.

16. The vent valve assembly of claim 13 in combination with a fuel tank member, wherein the third housing component is configured to be secured directly to an inner surface of the fuel tank member.

17. The vent valve assembly of claim 13, wherein the second housing component defines a first opening that functions as a vapor vent of the first valve; wherein the second housing component defines a second opening that functions as a vapor vent of the second valve; and wherein vapor flows from the first opening to the second opening.

18. The vent valve assembly of claim 17, wherein the first valve is configured to block the first opening in the second housing component when the first valve is lifted by a predetermined amount; and wherein the second valve is configured to prevent vapor that has passed through the first opening from passing through the second opening in the second housing component when pressure of the vapor is below a predetermined pressure.

19. The vent valve assembly of claim 17, wherein the second opening is axially-displaced from the first opening so that the vapor flow path through the vent valve assembly is nonlinear.

20. The vent valve assembly of claim 13, wherein the second housing component has continuous ridges that form a recess; and wherein the inner cap has a continuous flange fit between the ridges in the recess.

21. The vent valve assembly of claim 20, wherein the third housing component has a mounting portion that extends over the inner cap without securing to the inner cap.

22. The vent valve assembly of claim 21, wherein the continuous ridges extend toward the mounting portion; and wherein the continuous flange extends away from the mounting portion.

23. The vent valve assembly of claim 21, wherein at least a portion of a surface of the inner cap facing the mounting portion is spaced from the mounting portion.

24. A vent valve assembly comprising:
a first housing component;
a second housing component secured to the first housing component;
a third housing component;
an inner cap joined to the second housing component at a sealed joint;
a first valve;
a second valve;
wherein the third housing component secures to the first housing component such that the inner cap, the second housing component, the first valve and the second valve are surrounded by the first and third housing components; and wherein the first and the second housing components and the inner cap define a vapor flow path that directs vapor from the first valve to the second valve; and
wherein the first housing component and the second housing component are configured with complementary features that interfit to form a labyrinth seal to hold the first housing component to the second housing component.

25. The vent valve assembly of claim 24, wherein one of the first housing component and the third housing component has tab retainers; and wherein the other of the first housing component and the third housing component has snap tabs extending therefrom and configured to snap into and be retained by the tab retainers to attach the first housing component to the third housing component.

26. The vent valve assembly of claim 24 in combination with a fuel tank member, wherein the third housing component is configured to be secured directly to an inner surface of the fuel tank member.

27. The vent valve assembly of claim 24, wherein the second housing component defines a first opening that functions as a vapor vent of the first valve; wherein the second housing component defines a second opening that functions as a vapor vent of the second valve; and wherein vapor flows from the first opening to the second opening.

28. The vent valve assembly of claim 27, wherein the first valve is configured to block the first opening in the second housing component when the first valve is lifted by a predetermined amount; and wherein the second valve is configured to prevent vapor that has passed through the first opening from passing through the second opening in the second housing component when pressure of the vapor is below a predetermined pressure.

29. The vent valve assembly of claim 27, wherein the second opening is axially-displaced from the first opening so that the vapor flow path through the vent valve assembly is nonlinear.

30. The vent valve assembly of claim 24, wherein the second housing component has continuous ridges that form a recess; and wherein the inner cap has a continuous flange fit between the ridges in the recess.

31. The vent valve assembly of claim 30, wherein the third housing component has a mounting portion that extends over the inner cap without securing to the inner cap.

32. The vent valve assembly of claim 31, wherein the continuous ridges extend toward the mounting portion; and wherein the continuous flange extends away from the mounting portion.

33. The vent valve assembly of claim 31, wherein at least a portion of a surface of the inner cap facing the mounting portion is spaced from the mounting portion.

34. A method of assembling a fuel tank vent valve assembly having a first valve and a second valve, comprising:
assembling a first and a second housing component to one another along one directional axis so that the first valve and the second valve are laterally displaced from one another, with the first valve positioned at a first opening in the second housing component, and the second valve positioned at a second opening in the second housing component;

securing a cap to the second housing component so that the first housing component, the second housing component, and the cap define a vapor flow path that directs vapor from the first opening to the second opening such that vapor flows first through the first opening and then through the second opening; and securing a third housing component to the first housing component such that the cap, the second housing component, the first valve and the second valve are surrounded by the first and the third housing components.

35. The method of claim 34, wherein said securing the cap is by sonic welding.

36. The method of claim 35, further comprising:

attaching the third housing component to an inner surface of a fuel tank member.

37. The method of claim 36, wherein said attaching is by heat fusion.

* * * * *